United States Patent

Barnabei et al.

[15] 3,644,058
[45] Feb. 22, 1972

[54] AXIAL POSITIONER AND SEAL FOR TURBINE BLADES

[72] Inventors: Philip S. Barnabei, Medford, N.J.; Norbert Vettel, Philadelphia, Pa.

[73] Assignee: Westinghouse Electric Corporation, Pittsburgh, Pa.

[22] Filed: May 18, 1970

[21] Appl. No.: 38,197

[52] U.S. Cl. ............................ 416/95, 416/219, 416/220
[51] Int. Cl. .......................................................... F01d 5/18
[58] Field of Search ..................... 416/95, 96, 90, 220, 219

[56] References Cited

UNITED STATES PATENTS

| 3,490,852 | 1/1970 | Carlstrom et al. | 416/95 |
| 3,104,093 | 9/1963 | Craig et al. | 416/219 |

FOREIGN PATENTS OR APPLICATIONS

| 954,323 | 4/1964 | England | 416/220 |
| 341,486 | 3/1904 | France | 416/220 |

Primary Examiner—Martin P. Schwadron
Assistant Examiner—Clemens Schimikowski
Attorney—A. T. Stratton, F. Cristiano, Jr. and F. P. Lyle

[57] ABSTRACT

The invention comprises novel structure for axial positioning of turbine rotor blades and for sealing the cooling air passages under the blade root portions thereof.

The periphery of each rotor disc is provided with spaced, axially extending, side entry channels for receiving the root portions of the rotor blades. Cooling fluid is led into a passageway under the root portion of each blade and escapes through radial holes in the blade. An integral grooved extension is provided laterally of each root portion which supports thereon a downstream seal plate.

Sealing and locking segments are located downstream in a peripheral groove formed on the rotor disc, which segments effectively seal the root portions of the blades to the disc and prevent escape of cooling fluid. The sealing and locking segments cover a plurality of blades so as to reduce the number of leakage paths.

9 Claims, 7 Drawing Figures

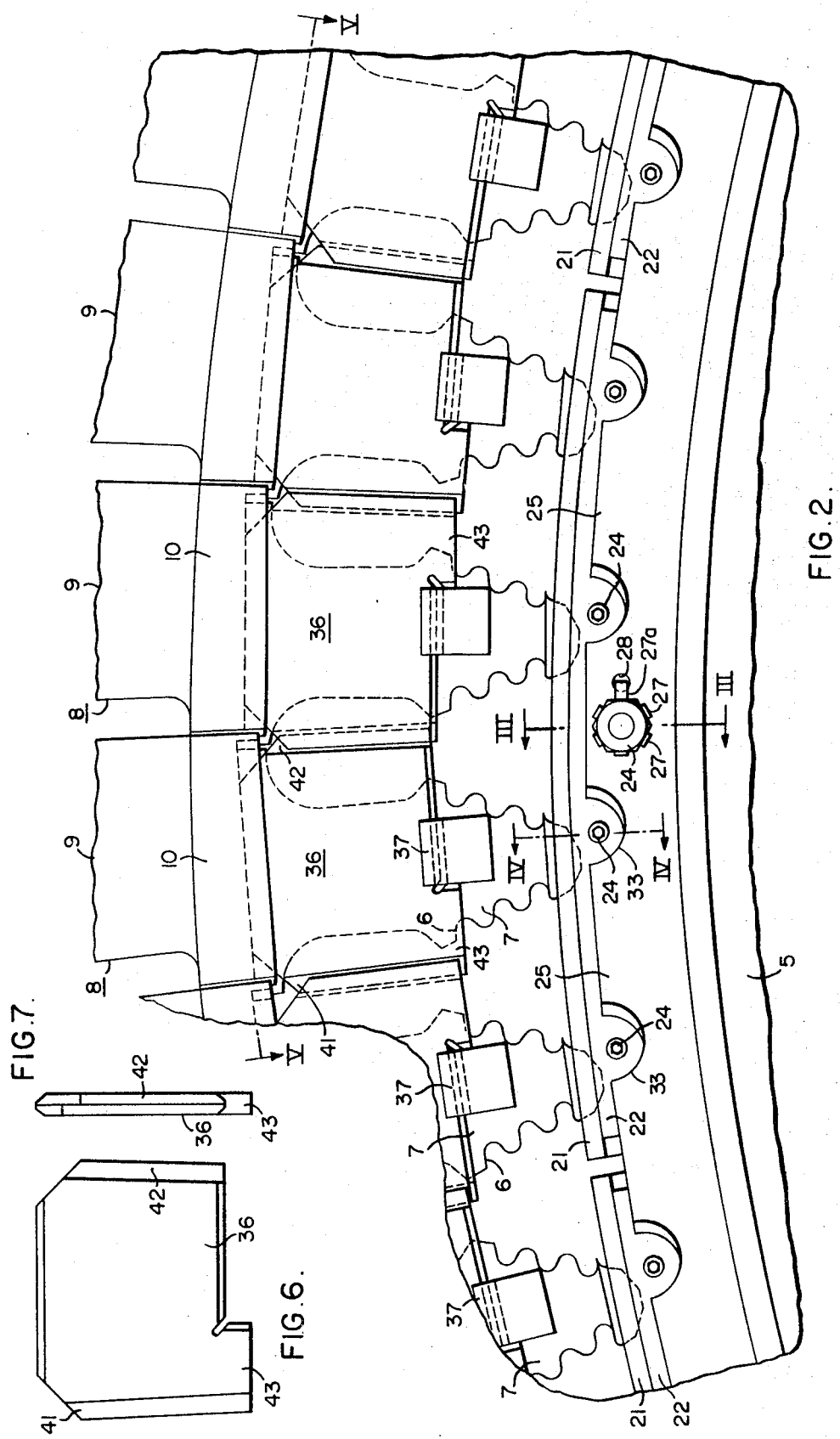

AXIAL POSITIONER AND SEAL FOR TURBINE BLADES

BACKGROUND OF THE INVENTION

The invention relates generally to turbine rotors and particularly to a structure for locking turbine rotor blades in the periphery of a blade supporting disc and for cooling the root portions of the blades in a turbine.

It is known that higher initial operating temperatures in a turbine, for example, an axial flow gas turbine, will provide high thermal efficiency and specific power output. It is also known that the allowable stress to which the blades can be subjected for a given blade life decreases with increasing temperatures. Thus, the main limiting factor in raising gas turbine operating temperatures, and thereby raising turbine efficiency and power output, is the physical capability of the rotating blades—the blades being highly stressed during turbine operations.

Rotating turbine blades are usually made individually and attached to the rim of a turbine wheel or disc so that they extend radially in an outward direction. When the disc is rotated, the blades are subjected to a tensile stress in the radial direction due to the centrifugal force (which is a function of the weight of the blade) attendant with rotation. The stress is greatest near the root or hub portion of the blade where it is attached to the turbine disc. The stress decreases toward the tip of the blade where it reaches a value of zero at the blade tip.

Presently, with most gas turbine designs, the temperature of the working gas flow is generally uniform along the radial height of the turbine blades. Since the root portion of the blade is stressed the greatest, and since an essentially uniform gas temperature flow sets the allowable stress for a particular blade and blade material, the root portion stress at a specified temperature is generally taken as the reference point in fixing the temperature at which the turbine blades are designed to operate in achieving a desired and efficient extraction of energy from the gas flow.

Thus, the roots of rotor blades should be maintained as cool as possible in order to extract maximum energy from the gas flow through the turbine and to insure long life for the blades.

In the past, the cooling of the blade root portions has been attempted with a variety of means including a variety of blanking plate schemes in which plates are disposed on the upstream or downstream (or both) sides of the blades. The plates usually cooperate with lengthwise passages provided in the vane or airfoil portions of the blades to direct cooling air therethrough. The cooling effectiveness of these arrangements has been less than desirable, particularly because of leakage of cooling fluid through plate joints on the downstream side. Further, the securing and locking processes required to prevent the plates from coming loose with high speed rotation of the rotor have been cumbersome and not always effective,—also have become very costly.

BRIEF SUMMARY

An object of the present invention is to provide a simple yet effective structure for confining the flow of cooling fluid radially outwardly through holes in the root of each rotor blade in a turbine. A sealing structure is provided on the downstream side of the rotor disc comprising sealing segments and locking segments bridging the root portions of a plurality of rotor blades so as to reduce the number of joints where leakage might occur, as well as to reduce costs.

Another object of the invention is to provide identical cavity seal plates interlocked together on the downstream side of the rotor blades and which are supported on integral ledges formed on the sides of the rotor root portions. Such plates are easily and quickly oriented with respect to their blades.

THE DRAWINGS

The invention, along with the objects and advantages thereof will be best understood from the following detailed description taken in connection with the accompanying drawings, in which:

FIG. 2 is a fragmentary, elevational view taken from the downstream side of the rotor blades of FIG. 1;

FIG. 6 is an elevational view of one of the seal plates shown in FIGS. 2 and 5; and, FIG. 7 is a side view of a seal plate taken from the right side as viewed in FIG. 6.

PREFERRED EMBODIMENT

Figure 1:
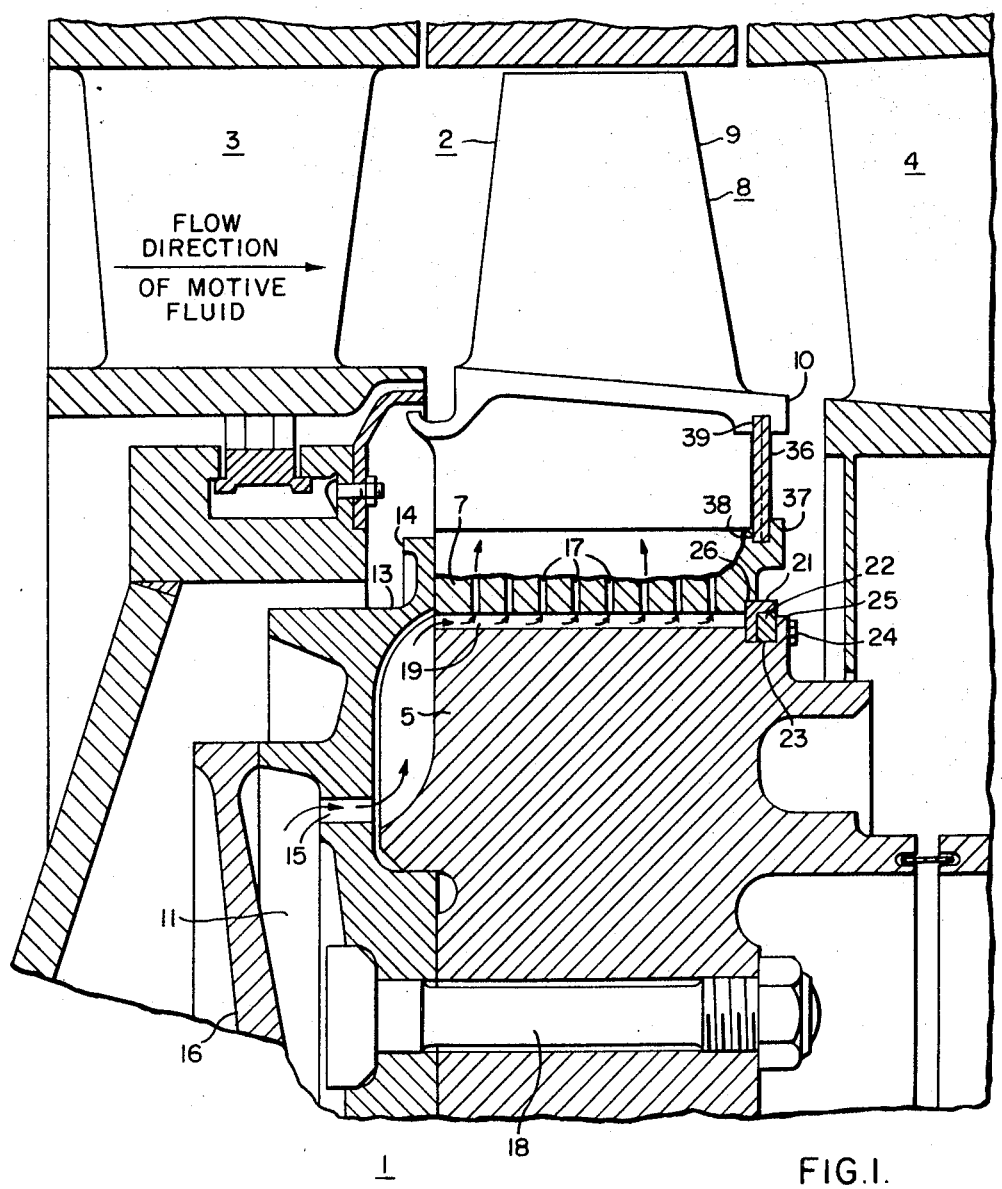
FIG. 1 is a fragmentary, cross-sectional view taken radially through one stage of a cooled gas turbine and showing a rotor blade construction in accordance with the principles of the invention.

Referring to FIG. 1 of the drawings in detail, numeral 1 generally denotes a portion of an axial fluid flow turbine, such as a gas turbine, comprising a first stage rotor 2, a first stage stator 3 and a second stage stator 4. Of course, additional alternate rotor and stator blades (not shown) are usually provided. The rotor comprises a disc 5 having a peripheral portion provided with axially extending serrated channels 6 (see FIG. 2) for receiving serrated root portions 7 of turbine blades 8 in intermeshing relation. Each of the blades 8, which are of the "side entry" type, has essentially three basic portions, namely the root portion 7, a platform portion 10 and an airfoil portion 9. As best seen in FIG. 2, the root portion 7 is comprised of a radially inner fir tree portion and a radially outer extended root portion. The extended root portion is generally of smaller width than the platform portion 10, as is well known in the art, and the adjacent extended root portions partially define cavities therebetween.

The blades 8 and disc 5 have an upstream side (left as viewed in FIG. 1) which faces, and is designed to receive, a flow of motive fluid (see top arrow) for driving the rotor 2, and a side facing away from said flow (right as viewed in FIG. 1) which is the downstream side.

An upstream sideplate 13 of disc shape is bolted by an annular array of bolts 18 (only one shown) to the upstream side of the rotor disc 5 with its outer rim portion 14 abutting the root portions 7 and is provided with an annular array of holes 15 (only one shown) through which cooling fluid, such as air, is passed from a passageway 11, along the path indicated by the arrows in FIG. 1. An air separator 16, also of disc shape, is attached to the plate 13 and forms the outer wall of the cooling fluid passageway 11.

The cooling fluid from the passageway 11 is thus forced to flow into the space or passageway 19 between the periphery of the rotor disc 5 and the perforated bottom part of the root portions 7 and thence will travel radially outwardly through the radial holes 17 formed in the root portion, and from there escaping through passageways in the blades 8. This type of cooling may be denoted as "root impingement".

An important feature of the present invention relates to the effective sealing of the root portions 7 of the rotor blades 8 at the downstream end. This is accomplished by the provision of arcuate sealing segments 21 and arcuate locking segments 22 (see FIGS. 1 and 2) which are supported in a peripheral groove 23 in the disc 5 and held firmly in place by lock screws 24, which are inserted in the annular lips or dogs 25 of the disc 5. By the use of setscrew tightening means, to be described hereinafter, each sealing segment 21 is sealingly held against a bottom ledge portion 26 of an adjacent root portion 7, so as to prevent or minimize escape of cooling fluid between the disc 5 and the blade 8 at the downstream side of root portion 7.

As shown more clearly in FIG. 2, the sealing segments 21, of right-angle cross section, confront and engage a plurality of root portions of adjoining blades, such as the four shown, so as to extend through a radial angle, say of about 18° in the specific illustration shown. However, it should be understood that a larger or smaller number of blades could be confronted and engaged by the sealing segments 21. It is preferable to provide a slightly smaller angle for the locking segments 22, such as an angle of about 17° 6' for sealing segments of about 18°, to facilitate proper assembly.

The head of each lock screw 24 is locked by a lock washer 27 having bent portions which engage the sides of the lock screwhead and having an extension 27a (FIG. 2) which terminates in a projection 28 which fits into a hole formed in the side of the disc 5 to insure against rotation of the lock screw.

Figure 3:
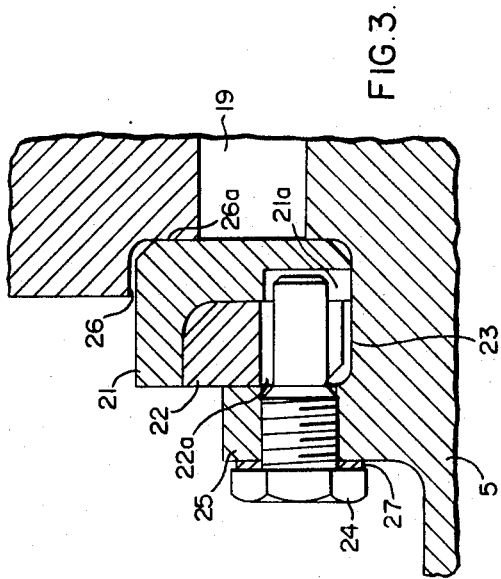
FIG. 3 is an enlarged, fragmentary, cross-sectional view taken along lines III—III of FIG. 2.
Figure 4:
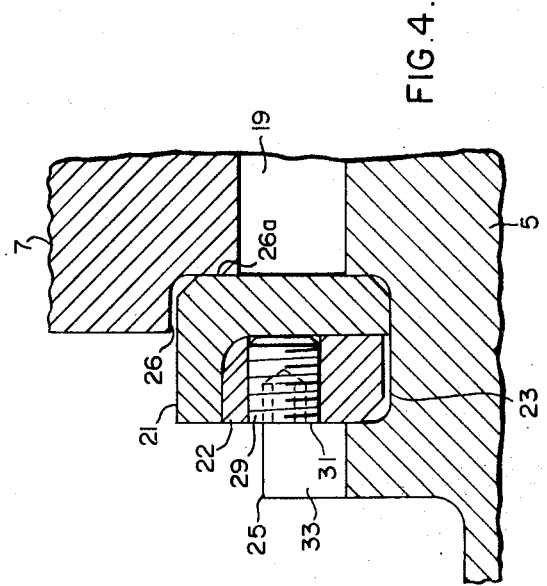
FIG. 4 is an enlarged, cross-sectional view taken along lines IV—IV of FIG. 2.

As seen in FIG. 3, the lock screw 24 extends through dog 25 of disc 5 and opening 22a of locking segment 22 and enters sealing segment 21 through a slot 21a therein so as to lock the respective segments in place. As shown in FIG. 4, setscrews 29 are screwed into peripherally spaced threaded holes in the locking segment 22 so that by tightening thereof, by inserting a wrench in the kerf or socket 31, the setscrews will serve the double function of compensating for the clearance between the sealing and locking segments and the disc groove 23, and that of pressing the sealing segments 21 against a ledge 26 in the root portion 7 so as to effectively seal the downstream end of the cooling passageway 19 under the root portion. The setscrews 29 are inserted through arcuate slots 33 in the disc lip portion or dog 25. These slots are continuations of the bottom part of the broached root grooves. The disc lip portion 25 has enough flexibility to take care of possible thermal expansion of the blade root portion 7 in the axial direction.

In operation, the parts are assembled as follows: The sealing segments 21, of equal length, are sequentially fitted by dropping them into the disc groove 23 and locating them by pushing them underneath the ledge portion 26 formed in the blade root portion 7. Locking segments 22, of equal length, are then sequentially brought underneath corresponding ledges formed by the angle-shaped sealing segments 21, and the remainder of the locking segments are similarly installed until the last locking segment. The locking segments 22 are rotated so as to butt end-to-end before the last locking segment is finally inserted.

The last sealing segment is then installed and the locking segment is brought into proper position. Lock screws 24 are installed and locked with lock washers 27. Finally, setscrews 29 are inserted and tightened so as to spread the locking segments 22 and sealing segments 21 apart so as to tightly engage the lip portion 25 and the radial wall 26a of ledge 26, respectively, to form a fluidtight seal so as to improve performance of the turbine. The setscrews 29 are preferably peened at several places. By virtue of locating the sealing segments 21 in ledge portions 26 in the blade root 7, centrifugal loading is distributed uniformly. Since the sealing and locking segments are installed radially, they permit easy and quick removal and installation in the field.

Another important feature of the invention resides in the construction and mounting of the cavity seal plates 36 (FIGS. 6 and 7) on the downstream side of the rotor 2. As best shown in FIGS. 1 and 2, an integral ledge 37 is formed on the downstream side of root portion 7 having a groove 38 for supporting the bottom tapered edge of cavity seal plate 36 while a groove 39 in the bottom of platform portion 10 supports the top tapered edge of plate 36. Grooves 38 and 39 of adjoining blades extend throughout the entire periphery of the rotor.

Figure 5:
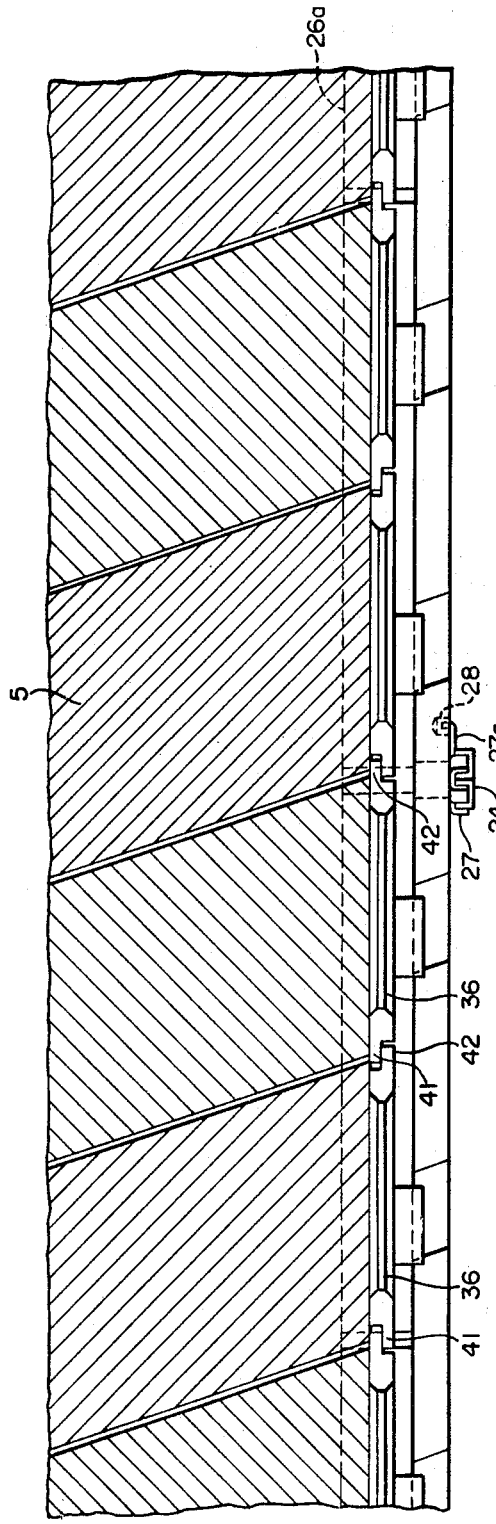
FIG. 5 is a cross-sectional view taken along lines V—V of FIG. 2.

The construction of each cavity seal plate 36 is shown in FIGS. 6 and 7, while the manner of their installation and interlocking is shown in FIGS. 2 and 5. Plate 36 is provided with lip or shoulder portions 41 and 42 on two opposed edges thereof which face in the same direction. In assembling plates 36, alternate plates are flipped over or reversed so that the adjoining edges will interlock in the manner shown in FIG. 5. A lower extension or indexing tab 43 is provided on plate 36 which depends from one edge of ledge 37, as seen in FIG. 2, for orienting the plates relative to the rotor blades. Thus, identical plates 36 may be quickly assembled and axially positioned on the downstream side of root portions 7 simply by supporting them in the grooves of the ledges 37 and the platform portions 10 and flipping alternate plates into interlocking relationship and so that their tabs depend from alternate sides of ledges 37. The interlocking plates 36 effectively block the downstream side of the cavities defined by the radially outer extended root portions of the rotor blades 8 to prevent the seepage of the hot motive fluid from the blade flow path (FIG. 1) into the cavities.

Thus it will be seen that an improved arrangement for axial positioning of rotor blades and sealing of the cooling air passage under the blade roots has been provided which will effectively prevent or minimize leakage of cooling air or other fluid in the downstream side of the blades so as to confine the flow of cooling air radially outwardly through radial holes in the roots of the blades. It will be further noted that by providing sealing segments which cover more than one blade (in the embodiment shown, covering four blades) the leakage paths are reduced, because of the reduced numbers of joints, and costs are reduced. Also, since the sealing and locking segments are carried in ledges underneath the blade roots, centrifugal loading is distributed more uniformly.

Though the invention has been described with a certain degree of particularity, changes may be made therein without departing from the spirit and scope thereof. For example, the invention has been described using only one rotor disc. Obviously, a plurality of such discs may be employed using the principles of the invention without departing from the scope of the invention. Similarly, the roots of the blades and the side entry disc channels may have other forms than the serrated form shown, as well as passageways formed in a manner different from that shown in FIG. 1 for cooling the blade roots. Also the sealing and locking segments and their tightening means may be of different construction to effect a seal against the roots.

What is claimed is:

1. In a rotor for an axial flow turbine comprising at least one rotor disc with side entry channels provided in the periphery thereof for receiving the root portions of rotor blades, the improvement comprising, a sideplate secured to said rotor in abutment with the upstream side of said root portions for confining the flow of cooling fluid to a passageway underneath each of said root portions, a plurality of radially outwardly extending holes through each of said root portions in communication with said passageways, sealing and locking means supported on the downstream side of said rotor disc and engaging the bottom portions of said root portions for confining the cooling fluid flow through said holes and preventing escape of cooling fluid from said passageways downstream of said disc, a bottom peripheral ledge being provided on the downstream side of said root portions for receiving said sealing means, said sealing means comprising a plurality of arcuate sealing segments of angle cross section having their corner portions seated in said peripheral ledges, said locking means including a plurality of arcuate locking segments received in said sealing segments, and means for spreading said sealing and locking segments apart in said peripheral groove.

2. The structure recited in claim 1 wherein said last named means comprises a plurality of spaced setscrews extending through and screw threaded to said locking segments and engageable with said sealing segments.

3. The structure recited in claim 2 wherein each of said sealing and locking segments extends across a plurality of blade roots.

4. The structure recited in claim 3 together with an integral lip portion provided on the downstream side of said rotor disc and defining one of the sidewalls of said peripheral groove, and a lock screw extending through said lip portion and through registering holes formed in each of said sealing and locking segments.

5. The structure recited in claim 3 together with an integral lip portion provided on the downstream side of said rotor disc and defining one of the sidewalls of said peripheral groove, and spaced openings provided on the top portion of said lip portion through which openings said setscrews extend.

6. The structure recited in claim 3 wherein said locking segments are slightly shorter than their corresponding sealing segments.

7. In a rotor for an axial flow turbine comprising at least one rotor disc with channels provided in the periphery thereof for receiving the root portions of rotor blades, the improvement comprising,
   means defining a passageway underneath each of said root portions,
   a disc-shaped sideplate on said rotor having its periphery in sealing abutment with the upstream side of said root portions for confining the flow of cooling fluid to said passageway,
   said root portions having a plurality of radially outwardly extending holes in communication with said passageway,
   ledge portions and platform portions extending from said root portions in radially spaced relationship,
   a plurality of interlocking seal plates supported between said ledge portions and platform portions,
   grooves being provided in said ledge and platform portions for receiving the top and bottom edges of said seal plates,
   each of said seal plates having shoulders on opposite side edges facing in the same direction, and
   wherein said alternate plates are reversed so that adjoining edges are interlocked.

8. Structure as recited in claim 7 wherein each of said sealing plates has a downwardly extending tab which engages the side of the corresponding ledge for orienting the plates relative to their respective rotor blades.

9. In a rotor for an axial flow turbine comprising at least one rotor disc with side entry channels provided in the periphery thereof, a plurality of rotor blade structures of the side entry type, said blade structures having an airfoil blade portion, a platform portion and a root portion, said root portion being comprised of a radially inner fir tree portion and a radially outer extended root portion, said blade structures being disposed in said channels of said rotor disc, the improvement comprising in combination:
   a sideplate secured to said rotor disc in abutment with the upstream side of said root portions for confining the flow of cooling fluid to a passageway underneath each of said root portions,
   a plurality of radially outwardly extending holes through each of said root portions in communication with each of said passageways,
   sealing and locking means supported on the downstream side of said rotor disc and engaging at least a portion of the radially inner fir tree portion of said root portions,
   said sealing and locking means confining the cooling fluid flow through said holes and preventing escape of cooling fluid from each of said passageways downstream of said disc,
   ledge portions extending from said inner fir tree portion of said root portions,
   platform portions extending from said root portions in radially spaced relationship,
   said ledge and platform portions being disposed radially outward relative to said sealing and locking means, and
   a plurality of interlocking seal plates supported between said ledge portions and platform portions to prevent leakage of motive fluid around the airfoil blade portions.

* * * * *